United States Patent [19]

Matsumoto et al.

[11] 4,450,256
[45] May 22, 1984

[54] PROCESS FOR PRODUCING THERMOPLASTIC RESIN

[75] Inventors: Sigemi Matsumoto, Takasago; Fumiya Nagoshi, Kobe, both of Japan

[73] Assignee: Kanegafuchi Kagaku Kogyo Kabushiki Kaisha, Osaka, Japan

[21] Appl. No.: 457,378

[22] Filed: Jan. 12, 1983

[30] Foreign Application Priority Data

Jan. 12, 1982 [JP] Japan ..................................... 57-3769

[51] Int. Cl.$^3$ ........................................... C08F 279/04
[52] U.S. Cl. .................................... 525/316; 525/261; 525/263; 525/292; 525/310
[58] Field of Search ............... 525/316, 261, 263, 292, 525/310

[56] References Cited

U.S. PATENT DOCUMENTS 4,007,234  2/1977  Schuddemage et al. ........... 525/316

*Primary Examiner*—J. Ziegler
*Attorney, Agent, or Firm*—Armstrong, Nikaido, Marmelstein & Kubovcik

[57] ABSTRACT

A thermoplastic resin which is outstanding in impact resistance and heat distortion resistance and is discolored only little by heat is produced by polymerizing, in the presence of diene type synthetic rubber, a monomer mixture of acrylonitrile and styrene, adding thereto a monomer mixture containing more than 80 wt % of α-methylstyrene, and then adding thereto little by little a monomer mixture containing more than 70 wt % of acrylonitrile, whereby 95–70 parts by weight of monomer is polymerized in the presence of 5–30 parts by weight of the diene type synthetic rubber.

1 Claim, No Drawings

PROCESS FOR PRODUCING THERMOPLASTIC RESIN

BACKGROUND OF THE INVENTION

1. Field of the Invention

The present invention relates to a process for polymerizing α-methylstyrene, acrylonitrile, styrene, and copolymerizable vinyl monomer in the presence of diene type synthetic rubber.

2. Description of the Prior Art

Heretofore, there have been proposed several methods for polymerizing monomers composed mainly of α-methylstyrene, acrylonitrile, and styrene in the presence of diene type synthetic rubber. These conventional methods, however, suffer from disadvantages that the resulting copolymer is not sufficient in impact resistance when it contains α-methylstyrene in a large amount, and is not sufficient in heat distortion resistance when it contains α-methylstyrene in a small amount. In order to overcome these disadvantages, there was proposed a new process in Japanese Patent Publication No. 14936/1969. However, this process is still insufficient in heat distortion resistance when the content of α-methylstyrene is less than 50 parts by weight.

In order to overcome the above-mentioned disadvantages, the present inventors carried out a series of researches which led to the finding that it is possible to obtain a thermoplastic resin which has high impact resistance and heat distortion resistance and low discoloration by heat, in such way that a monomer mixture composed mainly of acrylonitrile and styrene is subjected to polymerization in the presence of diene type synthetic resin, and subsequently a monomer mixture composed mainly of α-methylstyrene is added to the polymerization system, and finally a monomer mixture composed mainly of acrylonitrile is added little by little so that the polymerization is substantially completed.

SUMMARY OF THE INVENTION

It is an object of this invention to provide a process for producing in an industrially advantageous manner a thermoplastic resin which is outstanding in impact resistance and heat distortion resistance and is discolored only a little by heat to which the resin is exposed during and after molding.

The gist of this invention resides in a process for producing a thermoplastic resin which is outstanding in impact resistance and heat distortion resistance and is discolored only a little by heat, said process comprising the steps of polymerizing, in the presence of diene type synthetic resin, 2 to 40 parts by weight of a monomer mixture (A) composed of acrylonitrile and styrene, the ratio of acrylonitrile to styrene being 10–40/90–60 by weight, adding for polymerization 50 to 90 parts by weight of (B) α-methylstyrene monomer or a monomer mixture containing more than 80 wt% of α-methylstyrene, and adding little by little for polymerization (C) acrylonitrile monomer or an acrylonitrile monomer mixture containing more than 70 wt% acrylonitrile monomer, the ratio of α-methylstyrene to acrylonitrile in (B) and (C) being 95–65/5–35 by weight, whereby 95 to 70 parts by weight of monomer mixture composed of acrylonitrile, styrene, α-methylstyrene, and, if required, other monomers is polymerized in the presence of 5 to 30 parts by weight of the diene type synthetic rubber.

DETAILED DESCRIPTION OF THE INVENTION

According to the process of this invention for polymerizing 95 to 70 parts by weight of α-methylstyrene, acrylonitrile, styrene, and, if required, other copolymerizable monomers in the presence of 5 to 30 parts by weight of diene type synthetic rubber, a monomer mixture (A) composed mainly of acrylonitrile and styrene, a monomer mixture (B) composed mainly of α-methylstyrene, and a monomer mixture (C) composed mainly of acrylonitrile are added in the order listed. These mixtures may be added in any manner, but the mixture (B) should be added after most of the mixture (A) has been polymerized, and then the mixture (C) should be added little by little. The mixture (C) should be added continuously or stepwise, so that the ratio of α-methylstyrene to acrylonitrile in the polymerization zone is greater than 90/10, preferably 95/5 by weight, until the polymerization conversion reaches 40%.

The quantities of the diene type synthetic rubber and monomer mixtures (A), (B), and (C) vary depending on the required physical properties of the resin.

The quantity of the diene type synthetic rubber should preferably be 5 to 30 parts. If the limits are passed, the resulting resin is undesirable in impact resistance and heat distortion resistance.

The quantity of the monomer mixture (A) should be 2 to 40 parts, preferably 2 to 20 parts, and it should be composed of acrylonitrile and styrene at a ratio of 10-40/90-60 by weight. Less than 30% of the acrylonitrile and styrene may be substituted with other vinyl monomers such as α-methylstyrene, chlorostyrene, methyl methacrylate, and methacrylonitrile. If the quantity of the monomer mixture (A) used is excessive, the resulting resin is poor in heat distortion resistance; and if the quantity is too small, the resulting resin is poor in impact resistance.

The monomer mixture (B) should be 50 to 90 parts and should preferably contain more than 80 wt% of α-methylstyrene, and may contain less than 20 wt% of other vinyl monomers such as styrene, chlorostyrene, acrylonitrile, methacrylonitrile, and methyl methacrylate. If the quantity of the monomer mixture (B) is less than 50 parts, the resulting resin is poor in heat distortion resistance; and if the quantity exceeds 90 parts, the resulting resin is poor in impact resistance and the polymerization conversion is poor. In addition, if the content of other vinyl monomer in the monomer mixture (B) exceeds 20 wt%, the resulting resin is poor in heat distortion resistance.

The monomer mixture (C) should contain more than 70 wt% of acrylonitrile. The ratio of α-methylstyrene to acrylonitrile in monomer mixtures (B) and (C) should be 90-65/10-35 by weight. If the ratio is higher than this limit, the polymerization conversion is low and the resulting resin is poor in impact resistance; and if the ratio is lower than this limit, the resulting resin is discolored by heat. The monomer mixture (C) may contain vinyl monomers such as α-methylstyrene, styrene, chlorostyrene, methyl methacrylate, and methacrylonitrile.

According to the process of this invention, polymerization is accomplished preferably by emulsion polymerization in the usual way, but may be accomplished by any other type of polymerization. That is to say, the above-mentioned monomers are polymerized with the aid of radical initiator in an aqueous dispersant in the presence of diene type synthetic rubber. Examples of radical initiator include peroxide such as potassium persulfate, ammonium persulfate, and cumene hydroperoxide. In addition, polymerization accelerator, polymerization regulator, emulsifier, etc. may be used as required. The polymerization temperature should preferably be 30° to 80° C. The latex obtained by polymerization may be treated in the usual way to separate the resin, and the resin may be incorporated with stabilizer, plasticizer, and other processing aids and pigment.

were added all at once. The resulting polymer was found to have a polymerization conversion of 93%, an Izod impact strength of 10 kg-cm/cm, and a heat distortion temperature of 108° C.

Table 1 and the above-mentioned referential example indicate that the thermoplastic resins of this invention as represented by the examples are superior in impact resistance and heat distortion resistance and resistance to discoloration by heat.

TABLE 1

| | Example No. | | | | | Comparative Example No. (Unit: parts) | | |
|---|---|---|---|---|---|---|---|---|
| | 1 | 2 | 3 | 4 | 5 | 1 | 2 | 3 |
| Diene type synthetic rubber | 18 | 10 | 15 | 20 | 18 | 18 | 18 | 20 |
| Monomer mixture (A) | | | | | | | | |
| Acrylonitrile | 3 | 2 | 2.5 | 4 | 3 | 3 | 3 | 15 |
| Styrene | 6 | 4 | 5 | 8 | 6 | 6 | 6 | 30 |
| Methyl methacrylate | | | 1.5 | | 2 | | | |
| Cumene hydroperoxide | 0.1 | 0.06 | 0.1 | 0.1 | 0.1 | 0.1 | 0.1 | 0.2 |
| t-Dodecyl mercaptan | | | | | | | | 0.1 |
| Monomer mixture (B) | | | | | | | | |
| α-methylstyrene | 52 | 62 | 54 | 52 | 48 | 40 | 41 | 25 |
| Acrylonitrile | | | | 2 | 2 | | 10 | |
| Styrene | 4 | | | | | | | |
| t-Dodecyl mercaptan | 0.2 | 0.2 | 0.2 | 0.2 | | 0.2 | 0.2 | |
| Monomer mixture (C) | | | | | | | | |
| α-methylstyrene | | 2 | | | 3 | | | |
| Acrylonitrile | 17 | 20 | 18 | 16 | 16 | 33 | 22 | 10 |
| Styrene | | | | 1 | | | | |
| Methyl methacrylate | | | 4 | | 2 | | | |
| Cumene hydroperoxide | 0.3 | 0.3 | 0.3 | 0.3 | 0.3 | 0.8 | 0.3 | 0.2 |
| t-Dodecyl mercaptan | 0.15 | 0.2 | 0.2 | 0.15 | 0.4 | 0.2 | 0.2 | 0.4 |
| Final conversion (%) | 96 | 95 | 97 | 96 | 97 | 93 | 94 | 95 |
| Heat distortion temperature (°C.) 18.6 kg/cm$^2$ load, ASTM-D-648 | 115 | 118 | 116 | 115 | 115 | 108 | 110 | 103 |
| Izod impact, with notch ASTM-D-256 (kg-cm/cm) | 18.0 | 9.6 | 15.1 | 19.6 | 18.3 | 11.9 | 12.8 | 16.9 |
| Discoloration by heat* | − | − | − | − | − | + | + | ± |

Note to Table 1
*Evaluated by observing molded test pieces for Izod impact testing.
−Almost no discoloration
±Slight discoloration
+Discoloration The invention is now described in detail with reference to the following examples.

EXAMPLES 1 TO 5 AND COMPARATIVE EXAMPLES 1 TO 3

The following components were charged in a reactor equipped with a stirrer. After removal of oxygen, the contents of the reactor were stirred with heating at 60° C. under nitrogen stream. Then, synthetic rubber latex and the monomer mixtures (A), (B), and (C) as shown in Table 1 were charged in the order listed.

| Water | 250 parts |
|---|---|
| Sodium laurate | 2.5 |
| Sodium formaldehyde sulfoxylate | 0.4 |
| Disodium ethylenediaminetetraacetate | 0.01 |
| Ferrous sulfate | 0.0025 |

Incidentally, the sodium laurate and sodium formaldehyde sulfoxylate were added in parts during polymerization. After addition of an antioxidant, the resulting latex was coagulated, washed with water, filtered, dried, and pelletized. Using the pellets, physical properties of the polymer were measured.

In a referential example, the monomer mixtures (A), (B), and (C) of the same compositions as in Example 1

What is claimed is:

1. A process for producing a thermoplastic resin which is outstanding in impact resistance and heat distortion resistance and is discolored only little by heat, said process comprising the steps of:
   polymerizing, in the presence of diene type synthetic rubber, 2 to 40 parts by weight of a monomer mixture (A) composed of acrylonitrile and styrene, the ratio of acrylonitrile to styrene being 10–40/90–60 by weight,
   adding 50 to 90 parts by weight of (B) a monomer mixture containing more than 80 wt% of α-methylstyrene, after most of monomer mixture (A) has polymerized, and then
   stepwise adding (C) a monomer mixture containing more than 70 wt% of acrylonitrile while continuing polymerization, the ratio of α-methylstyrene to acrylonitrile in monomer mixtures (B) and (C) being 95–65/5–35 by weight,
   whereby 95 to 70 parts by weight of mixture of monomers containing acrylonitrile, styrene and α-methyl styrene are polymerized in the presence of 5 to 30 parts by weight of said diene type synthetic rubber.

* * * * *